(12) United States Patent
Allen, IV

(10) Patent No.: US 7,175,104 B2
(45) Date of Patent: Feb. 13, 2007

(54) BACKPACK WITH SPRAYER

(75) Inventor: Leigh B. Allen, IV, Selma, AL (US)

(73) Assignee: Woodlands Specialists, Inc., Selma, AL (US)

( * ) Notice: Subject to any disclaimer, the term of this patent is extended or adjusted under 35 U.S.C. 154(b) by 200 days.

(21) Appl. No.: 10/992,895

(22) Filed: Nov. 19, 2004

(65) Prior Publication Data

US 2005/0121462 A1 Jun. 9, 2005

Related U.S. Application Data

(60) Provisional application No. 60/524,086, filed on Nov. 21, 2003.

(51) Int. Cl.
*A01G 27/00* (2006.01)
*A01G 25/09* (2006.01)
*B67D 5/08* (2006.01)
*A62C 15/00* (2006.01)

(52) U.S. Cl. .................. 239/71; 239/67; 239/152; 239/153; 239/154; 239/146; 239/170

(58) Field of Classification Search .............. 239/71, 239/72, 73, 74, 67–70, 152, 153, 154, 146, 239/170; 222/175, 333, 385, 382
See application file for complete search history.

(56) References Cited

U.S. PATENT DOCUMENTS

| | | | | |
|---|---|---|---|---|
| 3,848,340 A * | 11/1974 | Hamm | ...................... | 33/354 |
| 5,255,195 A * | 10/1993 | Mochizuki et al. | ......... | 701/207 |
| 5,636,791 A * | 6/1997 | Leer | ........................... | 239/142 |
| 5,752,661 A * | 5/1998 | Lewis | ........................ | 239/153 |
| 5,785,245 A * | 7/1998 | Tedders et al. | ................ | 239/9 |
| 6,938,829 B2 * | 9/2005 | Doherty et al. | ................ | 239/1 |

* cited by examiner

*Primary Examiner*—Davis Hwu
(74) *Attorney, Agent, or Firm*—Smith, Gambrell & Russell, LLP

(57) ABSTRACT

An apparatus for spraying chemicals in a forestry environment includes a back pack supported reservoir for containing such chemicals and a variable speed pump for urging the chemicals from the reservoir through a rearwardly oriented spraying unit. Positional and delivery rate monitoring equipment may also be incorporated in the design.

15 Claims, 3 Drawing Sheets

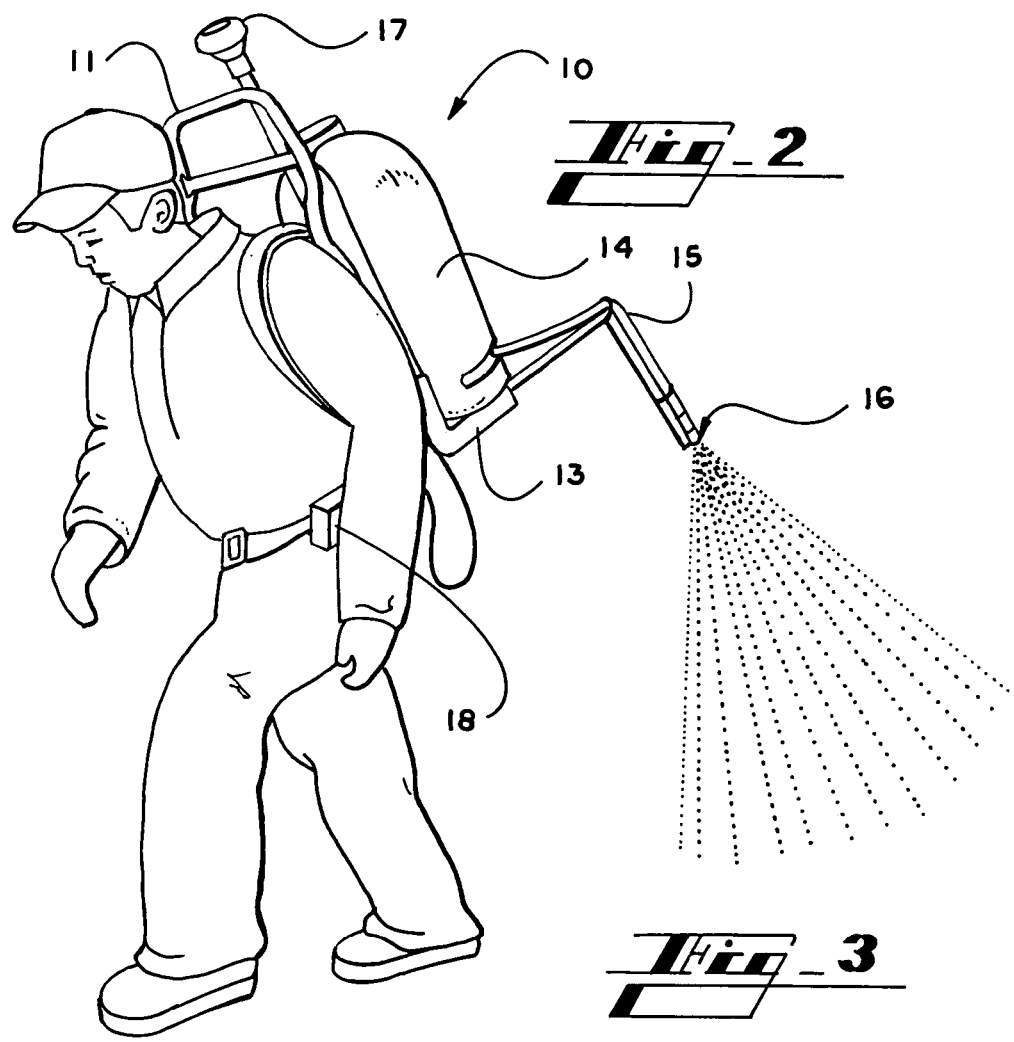
FIG_2
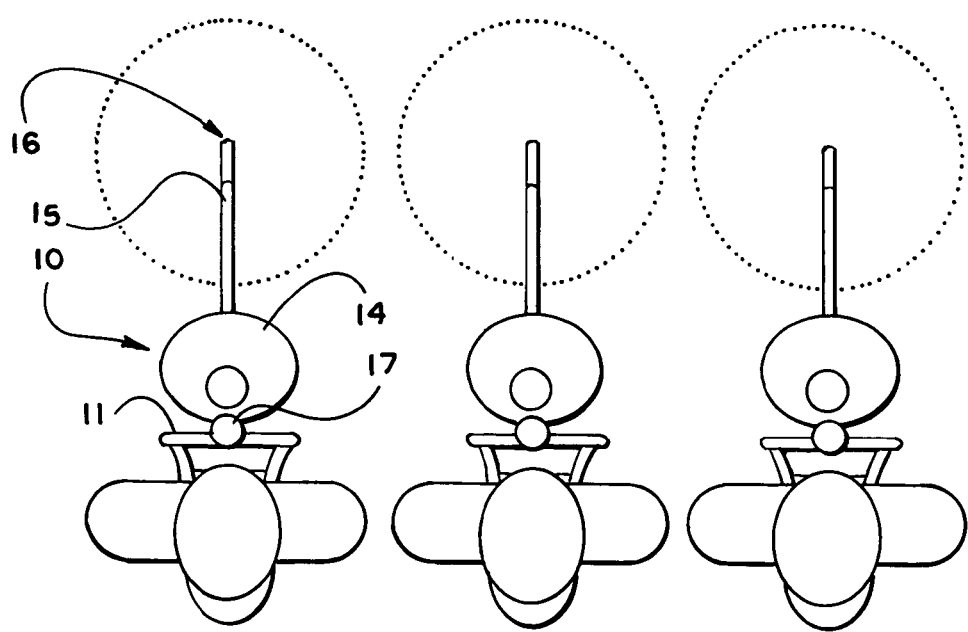
FIG_3

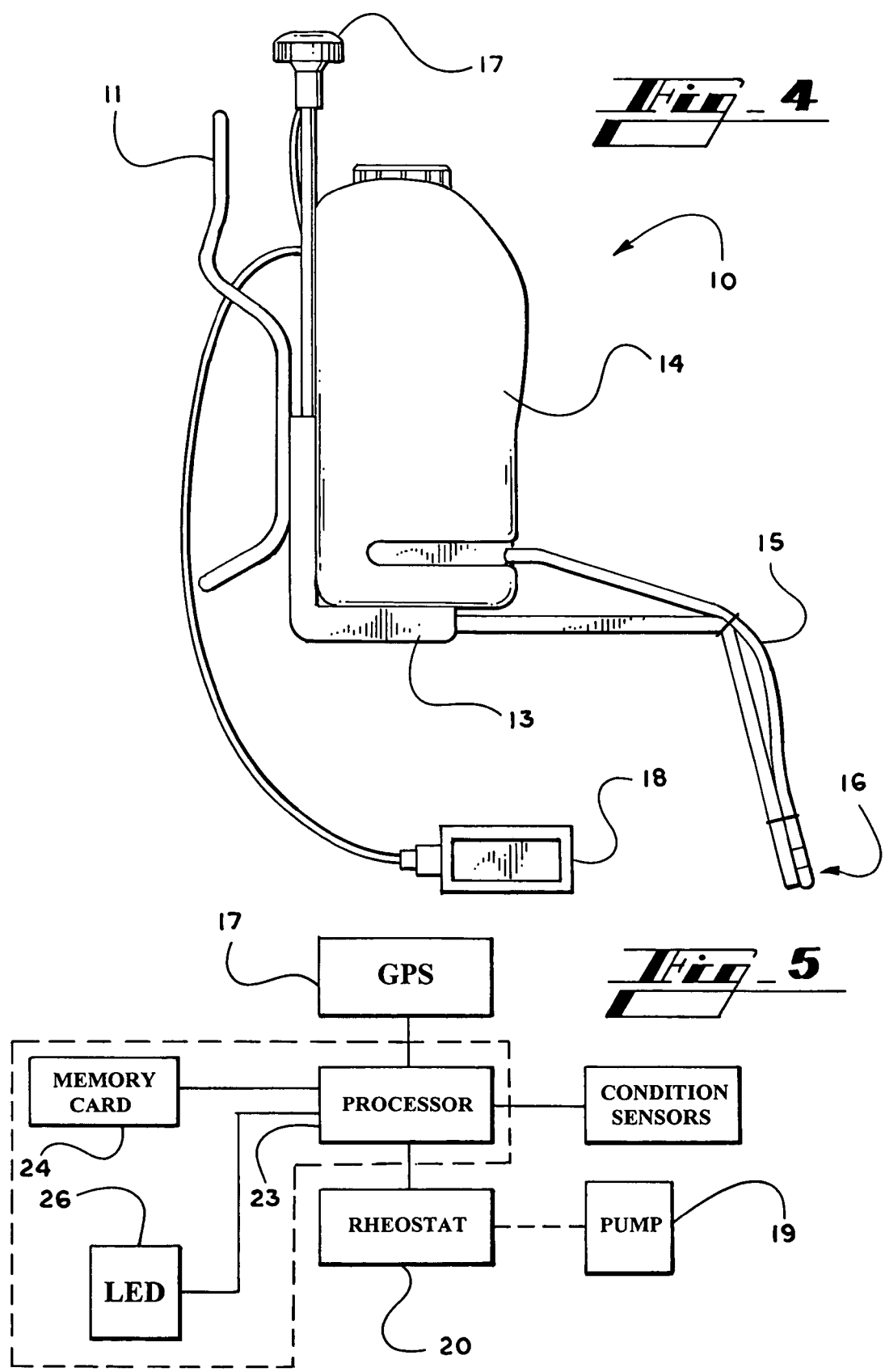

BACKPACK WITH SPRAYER

This application claims benefit of the filing date of provisional patent application Ser. No. 60/524,086, filed on Nov. 21, 2003.

BACKGROUND OF THE INVENTION

The present invention relates to the field of herbicide and chemical application in a forestry setting. More particularly, the present invention relates to precision application of herbicide and chemicals to a forestry setting, In even greater particularity, the present invention relates to backpack application of herbicide to forestry settings using workers walking across the terrain. In still greater particularity the present invention relates to back pack sprayers with reverse or reward application of herbicides and chemicals.

Currently, migrant workers are applying herbicide by traditional "wand" methods, and walking through the contaminated foliage without the required protective clothing. The workers often wear these herbicide-soaked clothes day after day. Product labeling related to backpack application is at best unclear and currently under review by the Environmental Protection Agency (EPA). Future work protection requirements will likely require development of new procedures, create the potential for lawsuit problems, and threaten the continued use of the method.

Contractors have huge incentives to underreport worker time. The current system provides no clear way for contractors lawfully dispersing herbicides to prove compliance with existing or future regulations., and customers find it difficult to audit herbicide contractors for compliance. Quality control is difficult for backpack operations. Since the individuals actually applying the herbicide are paid on production (per backpack) there are concerns that sometimes product is simply dumped. Missed rows, skips, streaks, over spray, and double sprayed rows are common. There are big differences in walking speeds between workers, thus presenting even application problems. Likewise. Tank mix proportions are often not correct or mixing tanks are oftentimes not agitated. For a variety of reasons spills, leaks, and uneven batching are the norm. Many thousands of acres are applied, banded and broadcast, using this flawed method by a variety of contractors. The principal reason for the continued use of the system is cost efficiency.

Precision ground application machines are capital-intensive, low production, and marginally profitable. The most profitable and least capital-intensive methods of ground application are backpack and farm tractor. Farm tractors are only suitable for limited terrain and debris loads. Further, few forestry farm tractor vendors have precision equipment.

What is needed is an improved apparatus for precision application of herbicide and chemical treatments to a forestry setting that provides protection to the worker and quality assurance to the contractor.

SUMMARY OF THE PRESENT INVENTION

It is an object of the invention to insure that laborers have minimum contact with herbicide once it has been applied.

It is another object of the invention to provide integrated Wide Area Augmentation System (WAAS) enhanced, differentially-corrected Global Position Satellite (GPS) system to provide parallel swathing, ground speed feedback, and data collection for backpack-applied herbicide.

Yet another object of the invention is to provide the ability to input individual worker identification to a backpack to allow worker performance to be evaluated for quality.

Still another object of the invention is to allow data to be audited for worker time and activity.

These and other objects of the present invention are accomplished through the use of a combination sprayer and GPS backpack for applying herbicides and tracking the application of such herbicides.

BRIEF DESCRIPTION OF THE DRAWINGS

An apparatus embodying the features of the present invention is depicted in the accompanying drawings which form a portion of this disclosure and wherein:

FIG. 2 is a representation of a spray path of a worker.
FIG. 3 is a plan view of multiple units in use.
FIG. 4 is a side elevational view of the sprayer apparatus in one embodiment of the invention;
and
FIG. 5 is a schematic block diagram of one embodiment of the data logger connected to the GPS, sensors and controls used in the apparatus.

DESCRIPTION OF THE PREFERRED EMBODIMENT

Figure 1:
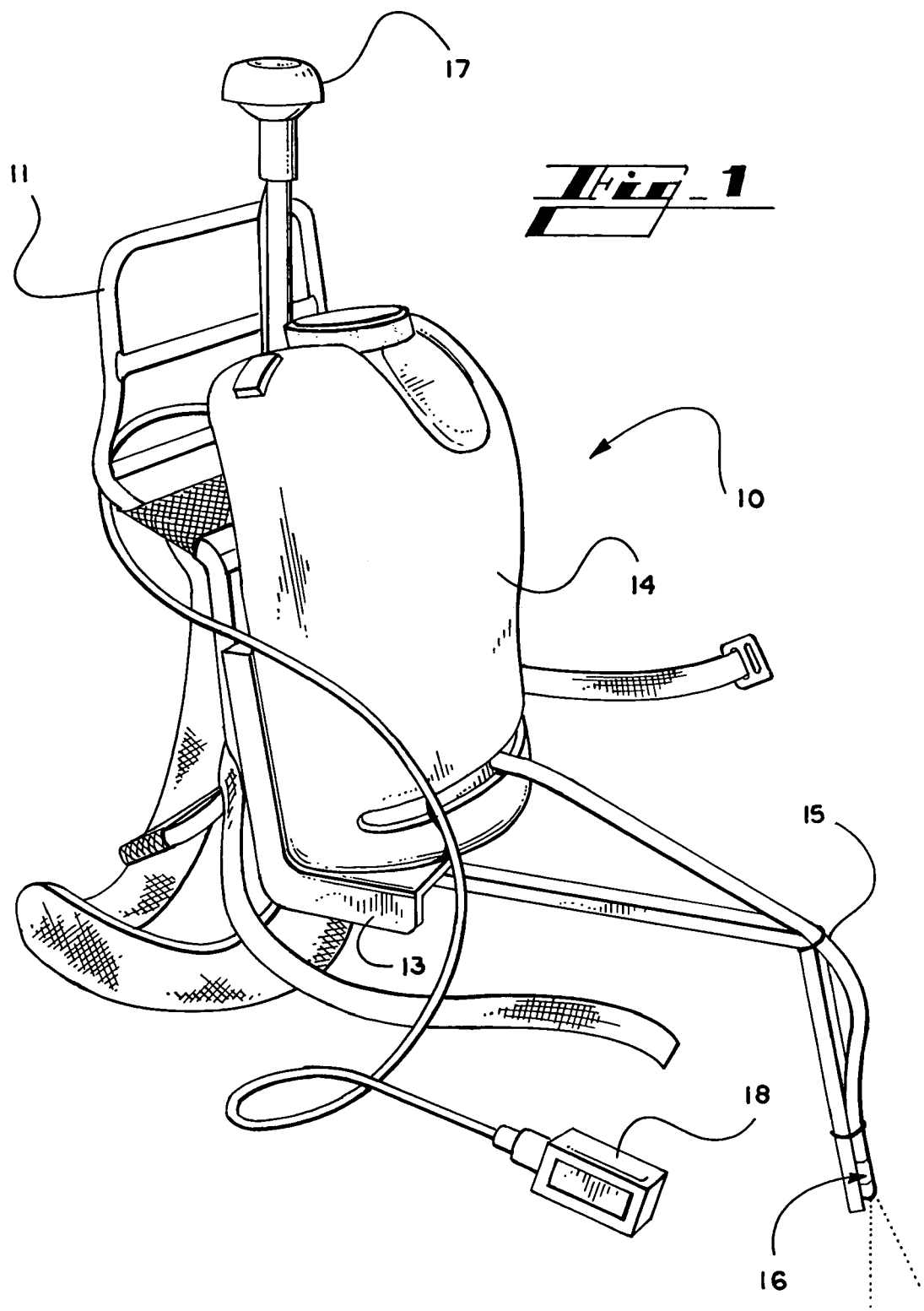
FIG. 1 is a Side perspective view of the apparatus.

Referring to the Figures for a clearer understanding of the invention, it may be seen that the preferred embodiment of the invention contemplates a single backpack 10 to be worn by a worker. The backpack 10 has any suitable harness arrangement to provide maximum comfort to the wearer. It has been found that a backpack frame 11, such as one made by Kelty, which is fully adjustable for worker height and is easily adapted to the present use. A custom built aluminum bracket 13 holds a reservoir or tank 14 and has a spray dispenser arm 15 removably mounted thereto from which herbicides or other chemicals are to be dispersed. The tank 14 may be a Shur-flo, 4 gallon sprayer tank with a battery operated pump 19 and integrally mounted battery 21. The pump 19 is variable speed, coupled with a rheostat 20 to adjust speed of pump. Alternatively, the reservoir 14 is pressurized to provide motive force from a pressurized gas cylinder, or a manual pump assembly (not shown) may be provided to pressurize reservoir 14.

Spray dispenser arm 15, in a form to be determined by the type chemical to be dispersed is mounted to the back pack assembly and extends rearwardly with outlet 16 for the spray facing rearwardly. The vertical extent of the dispenser arm 15 should not be so high as to be susceptible to engagement with overhanging limbs or obstructions and the lateral extent should be commensurate with the space needed for the worker to walk between obstacles. Quick disconnect spray arms to allow for multiple arms to help adjust for worker height, speed, terrain, prescription, etc. The spray pattern and specific parameters may be adjusted for particular applications. Therefore we provide interchangeable nozzles, such as those sold under the Teejet brand, to adjust for walking speed and prescription.

Also mounted to the frame is a WAAS enabled GPS receiver 17 such as a Garmin model 17a or like model. The GPS receiver 17 provides a display to the user to assist him in traversing a precise path during the application. The GPS device 17 is coupled to a small dedicated computing unit or custom built data logger 18 having a memory into which location and track data can be stored to record the area traversed by the worker wearing the backpack.

Data logger 18 includes a custom built etched circuit board and processor 23 that is capable of logging to a removable memory 24 inputs from the GPS receiver 17 representing latitude, longitude, date, time, number of satellites supplying WAAS GPS, WAAS enabled on or off. The data logger 18 is also capable of storing and processing switch inputs sensing whether a specific piece of equipment, for example pump 19, is on, inputs from any condition sensor which may provide data on temperature, humidity, a liquid level inside the tank. The data logger may optionally have outputs any or all equipment, to an LED screen 26, and is compatible with most off the shelf mapping and GPS programs. Preferably, memory 22 is embodied in a removable memory card for quick and easy download of info stored in the unit. Using the time data obtained from GPS unit 17 stored with and associated with the latitude and longitude the inputs from gps unit 17 the data logger can store or display the track followed by the operator, for example the pattern of application as shown in FIG. 3. With this information the processor is programmable to calculate speed at which the operator moved. Using the sensors indicating the liquid level in the tank the rate of application of the liquid to the area traversed may be calculated and a record is available as to the actual herbicide dispersed at various locations by the worker.

In another embodiment the data logger processor 22 unit utilizes the GPS information to calculate the speed at which the worker is walking and adjusts the rate of application from the reservoir to provide a consistent application of the herbicide per linear foot of the area traversed. Similarly using these inputs, the unit has the ability to provide Real Time mapping to the worker or provide him with speed information on a custom built speed LED display 26, which he can mount at a convenient viewing location.

As each worker exhausts his supply of chemical and returns to replenish the reservoir or end his shift, the recorded information can be downloaded to a master unit and all of the information can be combined and correlated to show precisely the area covered by the crew and the rate of application of the chemical. Areas which have not be covered can thus be easily pinpointed and the work details assigned to cover the remaining area. Significant saving of chemical and man hours can be achieved and the workers will no longer have walk through areas that they have already sprayed, thereby greatly reducing cost and exposure to herbicides. Preliminary data from three workers using prototype units built in accordance with this invention is presented in the following table.

| worker | # of tanks sprayed | Linear feet applied | Linear fee double sprayed | % rows double sprayed | Acres treated | Gross acres | Gross acres per hour | Avg. speed | % of time within target | Actual oz acre #1 | Acual oz acre #2 |
|---|---|---|---|---|---|---|---|---|---|---|---|
| 1 | 6 | 8352 | 164 | 2 | 2.3 | 5.5 | 1.2 | 2.2 | 85 | 2.17 | 26.04 |
| 2 | 6 | 10061 | 390 | 4 | 2.8 | 6.7 | 1.5 | 2.1 | 84 | 1.80 | 21.61 |
| 3 | 6 | 7490 | 74 | 1 | 2.1 | 5.0 | 1.1 | 2.1 | 83 | 2.42 | 29.03 |
| totals | 18 | 25,903 | 628 | 7 | 16.9 | | 1.3 | 2.1 | 84 | 2.13 | 25.56 |

As may seen from the table the present invention allows the contractor and customer to accurately monitor the application of the herbicide to the terrain. With multiple plots of application such as shown in FIG. 3 overlain over the area of interest the application of herbicide is easily quantified.

It is to be understood that the form of the invention shown is a preferred embodiment thereof and that various changes and modifications may be made therein without departing from the spirit of the invention or scope as defined in the following claims.

What is claimed is:

1. An apparatus for application for chemicals, comprising, a harness including a frame to be worn by a pedestrian worker, a reservoir for chemicals supported by said frame and harness, an outlet for dispensing chemicals from said reservoir as a spray directed rearwardly from the harness and said worker as said worker traverses a set course, and a data logger supported on said harness and recording the workers course and the amount of chemical dispersed.

2. The apparatus as defined in claim 1 wherein said data logger comprises a programmable circuit including a memory having an input from at least one sensor associated with said reservoir indicating the level of chemicals in said reservoir.

3. The apparatus as defined in claim 2 further comprising an electronic position sensor supported on said harness and having a data output to said programmable circuit indicating the geographic position of said harness at a given time.

4. The apparatus as defined in claim 3 wherein said programmable circuit includes a removable memory in which said chemical level and said geographic position data may be stored.

5. The apparatus as defined in claim 4 wherein said programmable circuit includes a program to compute the speed of said pedestrian worker and provides an output to a human sensible display for the worker to view.

6. The apparatus as defined in claim 4 wherein said programmable circuit includes a program to compute the speed of said pedestrian worker and the rate of dispersion of said chemicals from said reservoir such that the workers speed or the rate of dispersion can be adjusted to optimize the amount of chemical dispersed per foot of travel of said worker.

7. The apparatus as defined in claim 1 wherein said outlet for said chemicals from said reservoir is detachable and adjustable to accommodate a worker of different heights.

8. An apparatus as defined in claim 1 further comprising global positioning system unit affixed to said harness and having a data output including latitude and longitude of said harness at a particular time, and a data logger including a programmable logic circuit and a memory a for iteratively recording the position of said worker and the time the worker was at said position.

9. An apparatus as defined in claim 8 wherein said reservoir is connected to a pump for urging said chemical through said outlet.

10. An apparatus as defined in claim 9 wherein said pump is a variable speed pump.

11. An apparatus as defined in claim 9 wherein said pump is adjustable in accordance with the recorded position of a worker and a desired rate of flow of said chemical based on said position.

12. An apparatus as defined in claim 10 wherein said data logger is programmable to calculate the worker's speed from said iterative recordings of position and to determine the pump rate required to yield a desired application of chemical relative to the worker's speed.

13. An apparatus as defined in claim 10 wherein said data logger memory is accessible to retrieve data on said workers position at selected times, pump rate at said selected times, chemical level in said reservoir at said selected times, and further comprising a human readable display of said data and worker speed and chemical application values computed therefrom.

14. Apparatus as defined in claim 13 wherein said human readable display is capable of displaying data from multiple memories form multiple data loggers.

15. Apparatus as defined in claim 8 wherein said global positioning system is Wide Area Augmentation System (WAAS) enhanced, differentially-corrected Global Position Satellite system and is connected to said data logger to enable said data logger to record whether the WAAS was operable at any selected time during use of the apparatus.

* * * * *